(12) United States Patent
Ehrlich

(10) Patent No.: US 9,802,662 B2
(45) Date of Patent: Oct. 31, 2017

(54) BASE RAIL WITH BUMPER GUARD FOR A TRAILER

(71) Applicant: WABASH NATIONAL, L.P., Lafayette, IN (US)

(72) Inventor: Rodney P. Ehrlich, Monticello, IN (US)

(73) Assignee: Wabash National, L.P., Lafayette, IN (US)

(*) Notice: Subject to any disclaimer, the term of this patent is extended or adjusted under 35 U.S.C. 154(b) by 0 days.

(21) Appl. No.: 14/956,452

(22) Filed: Dec. 2, 2015

(65) Prior Publication Data

US 2016/0176458 A1 Jun. 23, 2016

Related U.S. Application Data

(60) Provisional application No. 62/096,081, filed on Dec. 23, 2014.

(51) Int. Cl.
| | |
|---|---|
| *B62D 63/08* | (2006.01) |
| *B60R 19/42* | (2006.01) |
| *B62D 65/16* | (2006.01) |
| *B60R 19/44* | (2006.01) |
| *B60R 13/01* | (2006.01) |
| *B62D 33/04* | (2006.01) |

(52) U.S. Cl.
CPC .............. *B62D 63/08* (2013.01); *B60R 13/01* (2013.01); *B62D 33/04* (2013.01)

(58) Field of Classification Search
CPC ....... B60R 19/445; B60R 19/44; B60R 13/01; B62D 63/08; B62D 65/16; B62D 33/04
USPC ...................................... 296/186.1
See application file for complete search history.

(56) References Cited

U.S. PATENT DOCUMENTS

| | | | | |
|---|---|---|---|---|
| 5,876,089 | A * | 3/1999 | Ehrlich ................ | B62D 33/046 296/186.1 |
| 8,839,731 | B2 * | 9/2014 | Rezzonico .............. | B63B 59/02 114/219 |
| 9,067,729 | B2 * | 6/2015 | Fenton ................. | B65D 88/121 |

\* cited by examiner

*Primary Examiner* — Glenn Dayoan
*Assistant Examiner* — Melissa A Black

(57) ABSTRACT

A base rail of a trailer includes an upper portion configured to be coupled to the inner surface of a sidewall of a trailer. The upper portion includes a plurality of spaced-apart ridges configured to extend inwardly away from an inner surface of the upper portion and into a storage area of the trailer. The base rail also includes a lower portion configured to be coupled to the floor assembly of the trailer, and a bumper guard coupled to the inner surface of the upper portion and positioned between spaced-apart ridges.

18 Claims, 3 Drawing Sheets

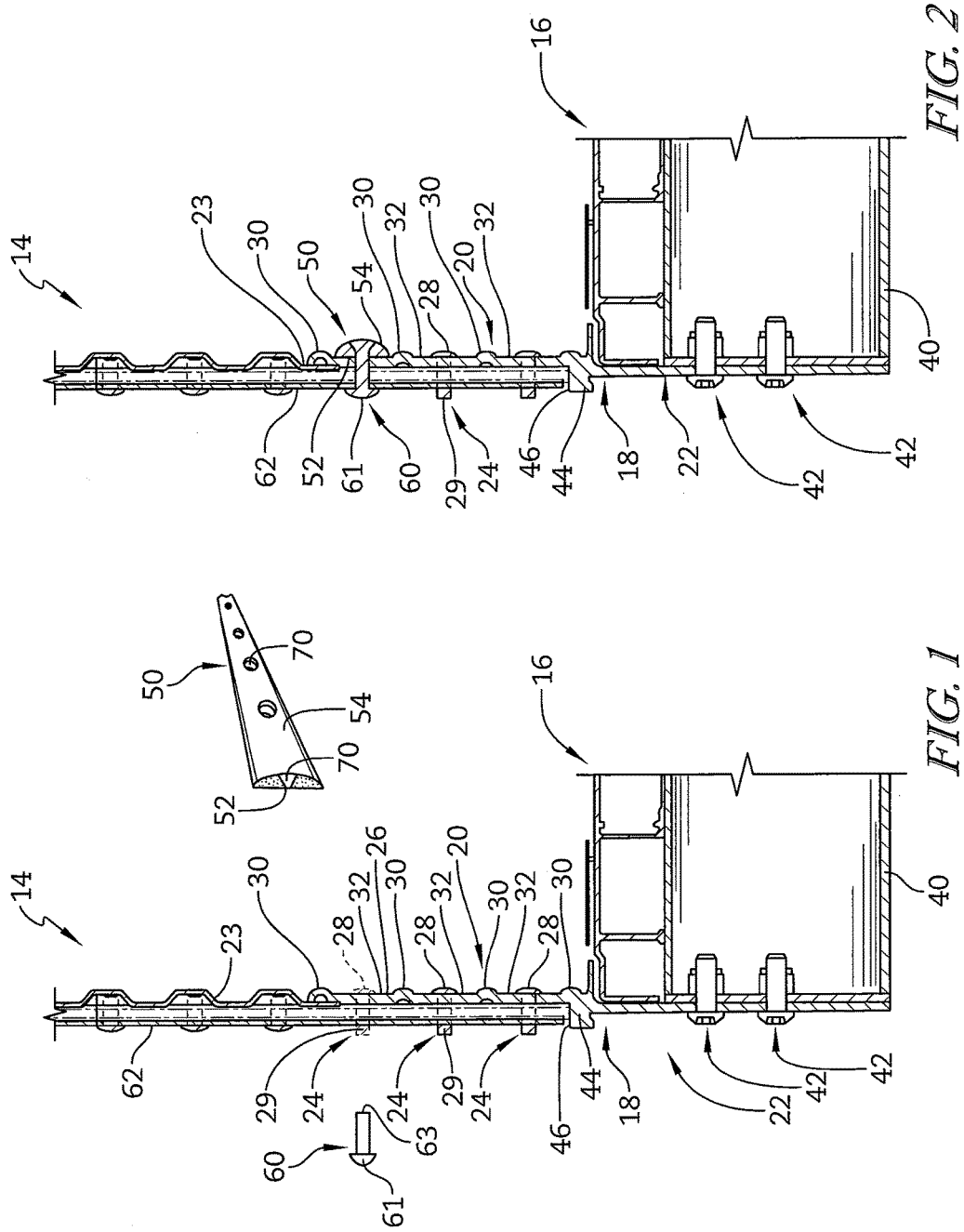

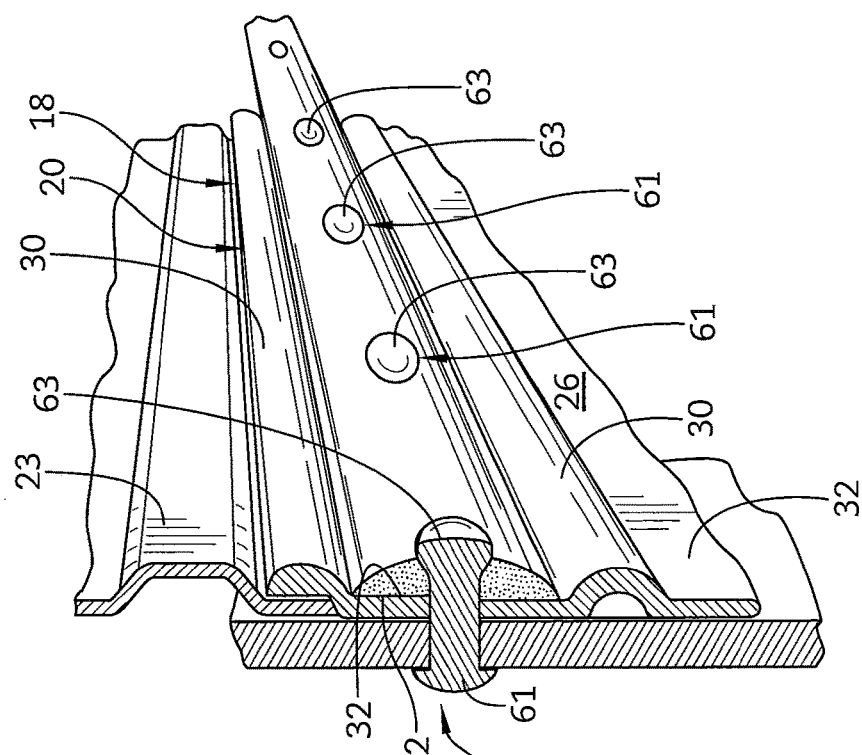
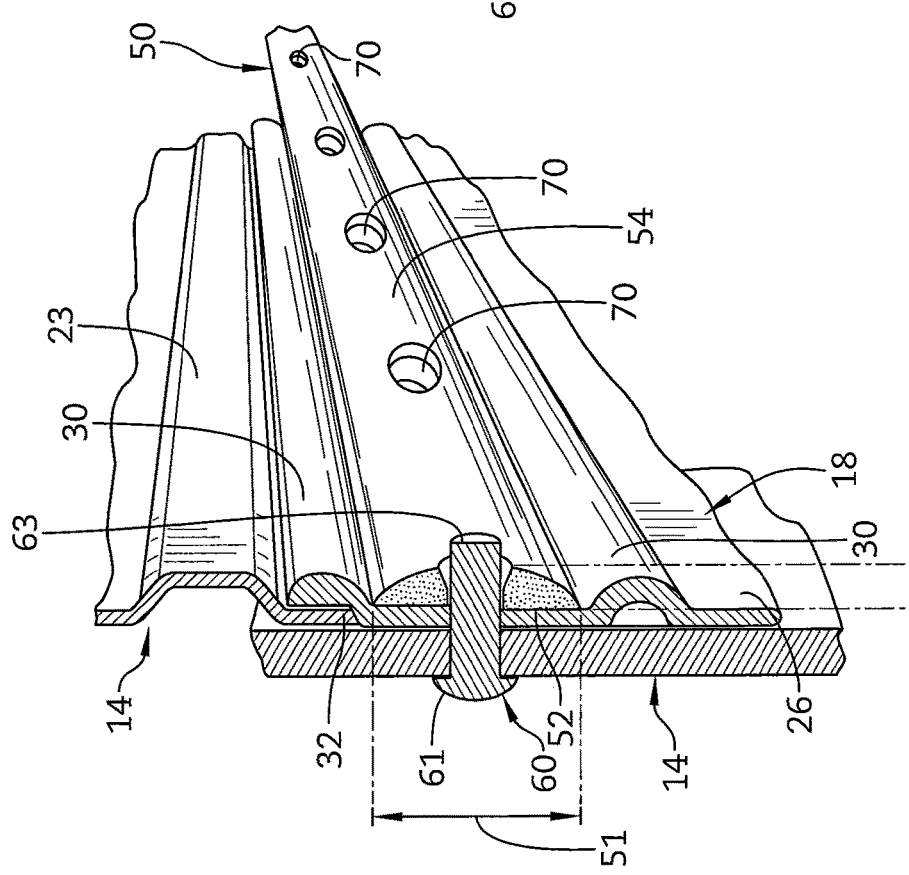

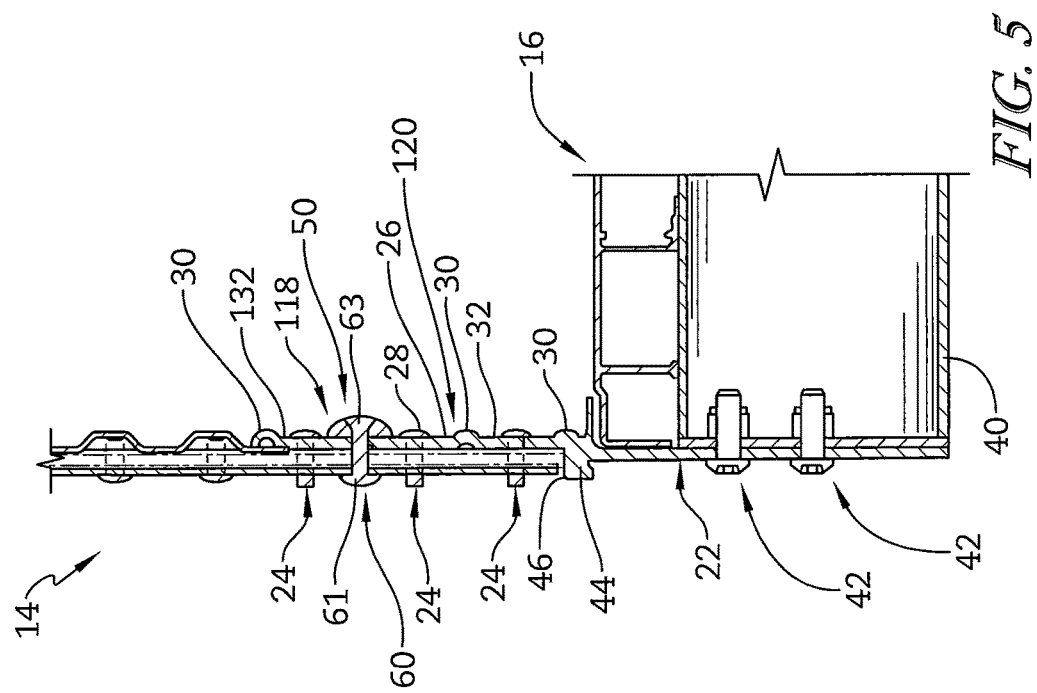

BASE RAIL WITH BUMPER GUARD FOR A TRAILER

This application claims priority under 35 U.S.C. §119(e) to U.S. Provisional Patent Application Ser. No. 62/096,081 filed Dec. 23, 2014 entitled BASE RAIL OF A TRAILER HAVING A BUMPER GUARD, the entirety of which is hereby incorporated by reference herein.

FIELD OF THE INVENTION

The present invention relates generally to semi-trailers, such as van-type trailers, for example. In particular, the present invention relates to a bumper rail for a semi-trailer.

BACKGROUND OF THE INVENTION

A typical base rail includes an upper portion that is coupled to an inner surface of the sidewalls of the trailer and extends substantially along a length of the trailer. During normal use of the trailer, during loading and unloading of cargo, for example, the base rail may become damaged due to normal wear and tear. For example, the wheels of lift trucks that are driven into the storage container portion of a trailer may damage the base rail of the trailer due to abrasion of the wheels against the base rail. The lift truck wheels typically include a hard, steel portion that may impact and abrade the base rail which is typically extruded from a softer metal such as aluminum. The base rail provides structural support to the trailer and continued damage to the base rail may result in failure of base rail and possibly to the accompanying sidewall of the trailer.

Steel bumper rail covers have been provided in an attempt to cover and protect the upper portion of the base rail from the aforementioned damage. Such bumper rail covers are fabricated to cover the entire height of the upper portion of the base rail such that no portion of the base rail above the floor assembly is exposed. While such covers may operate to protect the base rail from damage, such bumper rail covers can be costly and heavy and may not be desirable for these reasons.

SUMMARY

The present invention may comprise one or more of the features recited in the attached claims, and/or one or more of the following features and combinations thereof.

According to one aspect of the present disclosure, a base rail configured to be coupled to a sidewall and floor assembly of the trailer includes an upper portion configured to be coupled to the inner surface of a sidewall of a trailer. The upper portion includes a plurality of spaced-apart ridges configured to extend inwardly away from an inner surface of the upper portion and into a storage area of the trailer. The base rail further includes a lower portion configured to be coupled to the floor assembly of the trailer, a bumper guard coupled to the inner surface of the upper portion and positioned between spaced-apart ridges, and a plurality of rivets coupling the bumper guard to the base rail. A head of each rivet is configured to be positioned adjacent an outside surface of the sidewall of the trailer and an end of each rivet is substantially flush with an inner surface of the bumper guard. The bumper guard extends further inwardly into the storage area of the trailer than the spaced-apart ridges, and the bumper guard is made from a material that is harder than the upper portion of the base rail.

In one illustrative embodiment, the bumper guard may be approximately 1 inch tall and 5/16 inch wide.

In another illustrative embodiment, the bumper guard may be made of steel and the upper portion of the base rail may be made of aluminum.

In still another illustrative embodiment, the bumper guard may be generally half-oval in cross-sectional shape such that bumper guard may include a planar, outer surface adjacent the inner surface of the upper portion. The inner surface of the bumper guard may be curved and configured to extend inwardly into an interior of the storage area of the trailer.

In yet another illustrative embodiment, the bumper guard may include a plurality of apertures formed therethrough. Illustratively, each aperture may be tapered from an inner surface of the bumper guard to an outer surface of the bumper guard.

In still another illustrative embodiment, the bumper guard may be positioned between the two upper-most raised ridges of the upper portion. Illustratively, a planar surface of the upper portion between the two upper-most raised ridges may define approximately the same height as the bumper guard. Further illustratively, the bumper guard may be positioned between the two upper-most rivets of the plurality of rivets.

In yet another illustrative embodiment, the bumper guard may be spaced-apart from the floor assembly and is positioned within an upper half of the upper portion.

According to another aspect of the present disclosure, a base rail configured to be coupled to a sidewall and floor assembly of a trailer includes an upper portion configured to be coupled to the inner surface of a sidewall of a trailer. The upper portion includes a plurality of spaced-apart ridges configured to extend inwardly away from an inner surface of the upper portion and into a storage area of the trailer. The base rail further includes a lower portion configured to be coupled to the floor assembly of the trailer and a bumper guard coupled to the inner surface of the upper portion and positioned between spaced-apart ridges.

In one illustrative embodiment, a width of the bumper guard may be greater than a width of the raised ridges.

In another illustrative embodiment, the bumper guard may be made of a different material than the upper portion of the base rail.

In yet another illustrative embodiment, the bumper guard may be made of a harder material than the upper portion of the base rail.

In still another illustrative embodiment, the bumper guard may include a plurality of apertures formed therethrough. Illustratively, each aperture may be tapered from an inner surface of the bumper guard to an outer surface of the bumper guard. Further illustratively, the base rail may also include a plurality of rivets coupling the bumper guard to the upper portion of the base rail. Each of the plurality of rivets may include a head configured to be positioned adjacent an outside surface of the sidewall of the trailer, and an end adjacent and flush with the inner surface of the bumper guard.

According to yet another aspect of the present disclosure, a method of coupling a base rail to a trailer includes coupling an upper portion of the base rail to an inner surface of the sidewall and placing a bumper guard adjacent an inner surface of the upper portion between two raised ridges of the upper portion of the base rail. Illustratively, the bumper guard includes pre-punched apertures. The method further includes drilling holes through the upper portion of the base rail and the sidewall using the pre-punched apertures of the bumper guard as a guide, and inserting rivets through the drilled holes and pre-punched apertures from outside the sidewall to position the head of the rivet adjacent an outside surface of the sidewall.

In one illustrative embodiment, inserting rivets may include bucking an end of the rivet to create a smooth, inner surface of the base rail.

In another illustrative embodiment, coupling an upper portion of the base rail may include inserting rivets through the base rail and the sidewall in order to position the head of the rivets adjacent an inside surface of the upper portion of the base rail.

In still another illustrative embodiment, the method also includes removing the bumper guard from the upper portion of the base rail, and coupling a second bumper guard to the upper portion of the base rail.

BRIEF DESCRIPTION OF THE DRAWINGS

FIG. 1 is a sectional view of a portion of a storage container of a trailer showing a sidewall of the trailer, a floor assembly of the trailer, and a base rail coupled to the floor assembly and the sidewall of the trailer, and further showing a bumper guard of the present disclosure to be coupled to an upper portion of the base rail.

FIG. 2 is a sectional view similar to FIG. 1 further showing the bumper guard of the present disclosure coupled to the upper portion of the base rail in order to prevent damage to the upper portion of the base rail from the wheel of a lift truck (not shown), for example.

FIG. 3 is a perspective view of a portion of the sidewall and the base rail of FIG. 2.

FIG. 4 is a perspective view similar to FIG. 3 showing a rivet inserted from the outside of the trailer through the sidewall, the upper portion of the base rail, and the bumper guard to provide a smooth outer surface of the bumper guard.

FIG. 5 is a sectional view of a portion of an alternative storage container of a trailer showing a sidewall of the trailer, a floor assembly of the trailer, an alternative base rail coupled to the floor assembly and the sidewall and including the bumper guard coupled to the upper portion of the alternative base rail.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles or storage containers generally, and more specifically to conventional box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

A trailer of the present disclosure includes a storage container having spaced-apart sidewalls 14 (only a portion of one of which is shown in FIG. 1) and a floor assembly 16 coupled to and extending between the sidewalls 14. The storage container of the trailer further includes a rear end wall assembly (not shown) and a front end wall assembly (not shown) each coupled to both the sidewalls 14 and the floor assembly 16, as well as a roof assembly (not shown) coupled to the sidewalls 16 and the rear end wall assembly. A base rail 18 of the storage container is coupled to each sidewall 14 and to the floor assembly 16 to run along the length of the storage container, as shown in FIG. 1.

Illustratively, the base rail 18 includes an upper portion 20 positioned generally above the floor assembly 16 and a lower portion 22 coupled to and positioned generally below the upper portion 20. As shown in FIGS. 1 and 2, the upper portion 20 is coupled to an inner surface 23 of the sidewall 14 typically using the three illustrative rivets 24 shown in FIG. 1 (the upper-most rivet 24 is shown in phantom). As shown in FIG. 1, the rivets 24 are inserted from the inside surface 26 of the upper portion 20 of the base rail 18 through the sidewall 14 such that the rivet heads 28 are positioned adjacent the inside surface 26 of the upper portion 20 and the rivet ends 29 are positioned adjacent an outside surface 62 of the sidewall 14 of the trailer. While illustrative rivets 24 are shown, it is within the scope of this disclosure for the upper portion 20 of the base rail 18 to be coupled to the sidewall 14 using any suitable fastener and/or adhesive.

The illustrative upper portion 20 of the base rail 18 includes raised ridges 30 which extend horizontally along a length of the base rail 18. Four illustrative raised ridges 30 are provided, though, it is within the scope of this disclosure for the base rail 18 to include any number of raised ridges 30. The illustrative raised ridges 30 protrude inwardly toward the interior of the storage container and are vertically spaced-apart from each other to define three generally flat, or planar areas 32 therebeween. The rivets 24 are located within the flat areas 32 so that the heads 28 of the rivets 24 do not generally protrude inwardly toward the interior of the storage container beyond the raised ridges 30.

The lower portion 22 of the base rail 18 is generally planar and is coupled to the floor assembly 16, as shown in FIGS. 1 and 2. The lower portion 22 of the base rail 18 is specifically coupled to an outer end of the cross-members 40 of the floor assembly 16 using the illustrative nut and bolt fasteners 42 shown. It should be understood that any suitable fastener may be used as well. The lower portion 22 of the base rail 18 is positioned generally directly below the sidewall 14. The base rail 18 further includes a ledge 44 coupled to and positioned between the upper and lower portions 20, 22 of the base rail 18. The ledge 44 extends outwardly away from an outer surface of each of the upper and lower portion portions 20, 22 to define an upper surface 46 upon which the lower end of the sidewall 14 rests. The base rail 18 is typically made of aluminum, though any suitable material may be used.

In use, the raised ridges 30 of the upper portion 20 of the base rail 18 are provided in an effort to protect the rivet heads 28 from general wear and tear of the base rail 18 during loading and unloading of cargo to and from the interior of the storage container, for example. However, the steel rim of lift truck wheels (not shown) oftentimes operates to significantly wear down the raised ridges 30 of the aluminum upper portion 20 of the base rail 18. In this event, the steel rim of the lift truck wheels may also snag a rivet head 28 and tear the rivet head 28 off. In particular, the two upper-most raised ridges 30 typically see the most abrasion by the steel rim of the lift truck wheels such that the rivet head 28 of the upper-most rivets 24 of the base rail 18 is able to be snagged and torn off the base rail 18. Such damage to the upper portion 20 of the base rail 18 may lead to structural damage of the base rail 18 and even failure of the base rail 18.

In order to prevent damage to the aluminum base rail 18 due to abrasion from the steel rim of the lift truck wheels, the base rail 18 of the present disclosure includes a bumper guard 50 coupled to the upper portion 20 of the base rail 18. The illustrative bumper guard 50, shown in FIGS. 1-4 is made of steel, rather than aluminum, and is therefore much more durable when abraded or impacted by an object, such as the steel wheels of the lift truck, for example. Illustratively, while the bumper guard 50 is made from steel, it should be understood that the bumper guard 50 may be made from any suitable material that is harder than the upper portion 20 of the base rail 20. In particular, the bumper guard 50 may be made from any one or more plastic(s), composite(s), metal(s), or metal alloy(s), for example. The illustrative bumper guard 50 generally forms a semi-oval in cross-section, as shown in FIG. 2, to define a planar, outer surface 52 and a curved, inner surface 54. However, the bumper guard 50 may define any suitable cross-sectional shape such as, for example, rectangular, square, triangular, etc. The planar surface 52 of the bumper guard 50 is coupled to and engaged with a planar portion 32 of the inner surface 26 of the upper portion 20 of the base rail 18. In particular, the planar surface 54 of the bumper guard 50 is coupled to the upper-most planar surface 32 of the base rail 18 and is, therefore, positioned between the two upper-most raised ridges 30 of the base rail 18, as shown in FIGS. 2-4. It should be understood, however, that the bumper guard 50 may be coupled to any of the planar surfaces 32 of the upper portion 20 of the base rail 18.

The illustrative bumper guard 50 defines a height 51 of approximately 1 inch and a width 53 of approximately 5/16 inch. However, the bumper guard 50 may define any suitable height and width. The width of the bumper guard 50 is greater than a width of the raised ridges 30 such that an inward-most portion of the curved surface 54 of the bumper guard 50 protrudes inwardly into the interior of the storage container beyond an inward-most portion of the raised ridges 30 of the upper portion 20 of the base rail 18. As such, an object within the interior of the storage container may impact the bumper guard 50 instead of the raised ridges 30 of the upper portion 20 of the base rail 18. Because the bumper guard 50 is made from a harder material than the upper portion 20 of the base rail 18, the bumper guard 50 is better able to resist damage from being impacted and abraded by objects within the storage container. Accordingly, the bumper guard 50 operates to protect the upper portion 20 of the base rail 18 from damage due to impact and/or abrasion of objects such as, for example, the steel wheels of a lift truck.

Illustratively, the bumper guard 50 is coupled to the upper portion 20 of the base rail 18 by rivets 60 inserted from the outside surface 62 of the sidewall 14, through the sidewall 14, through the upper portion 20 of the base rail 18, and through the bumper guard 50, as shown in FIG. 2. As such, the rivet head 61 is located adjacent the outer surface 62 of the sidewall 14 while the rivet end 63 is located adjacent the curved inner surface 54 of the bumper guard 50. Positioning the rivet head 61 outside the trailer may operate to resist separation of the bumper guard 50 and upper portion 20 of the base rail 18 from the sidewall 14 in the event that the trailer sidewalls 14 are urged to bow outwardly due to typical stresses seen during normal activity and use of the trailer. Illustratively, the bumper guard 50 is pre-punched to form apertures 70, as shown in FIGS. 3 and 4. The apertures 70 are pre-punched from the curved surface 54 through the bumper guard 50 to the planar surface 52 of the bumper guard 50 using a die to create a naturally-tapered through hole. As such, the apertures 70 are slightly tapered from the curved surface 54 of the bumper guard 50 to the planar surface 52 of the bumper guard 50. The rivet 60 is installed from outside the trailer and is bucked to fill the punched and tapered aperture 70 of the bumper guard 50. As such, the end 63 of the rivet 60 is bucked such that it sits generally flush with the curved surface 54 in order to provide a generally snag-free curved surface 54 of the bumper guard 50. Illustratively, a distance between the centers of adjacent apertures 70 is approximately 4 inches; however, it should be understood that the apertures 70 may be spaced any suitable distance apart from each other.

In the original manufacture of a trailer, the upper portion 20 of the base rail 18 is coupled to the sidewall 14 of the trailer using the rivets 24 while leaving off the top-most row of the rivets 24 (shown in phantom in FIG. 1) that are typically used when a base rail without a bumper guard, such as the bumper guard 50, is provided. The bumper guard 50 is then placed between the two top-most raised ridges 30 and holes are drilled through the upper portion 20 of the base rail 18 and the sidewall 14 to align with the pre-punched apertures 70 of the bumper guard 50. The apertures 70 of the bumper guard 50 are used as a guide when drilling the holes through the sidewall and upper portion 20 of the base rail 18. Once the holes are drilled, rivets 60 are inserted from the outside of the trailer through the holes in the sidewall 14 and the upper portion 20 of the base rail 18 as well as through the apertures 70 of the bumper guard 50. As noted above, the ends 63 of the rivets 60 are bucked to fill the naturally tapered holes 70 and to create a generally smooth, snag-free outer surface 54 of the bumper guard 50.

The bumper guard 50 may also be retrofit onto existing trailers that already include a base rail without a bumper guard. To retrofit the bumper guard 50 onto an existing trailer, any of the remaining top-most rivets 24 (shown in phantom in FIG. 1) coupling the upper portion 20 of the base rail to the sidewall 14 of the trailer are removed. The bumper guard 50 (including the pre-punched apertures 70) is then placed onto the upper-most planar surface 32 of the upper portion 20 between the two upper-most raised ridges 30. Holes are then back-drilled through the sidewall 14 and the upper portion 20 of the base rail using the existing apertures 70 of the bumper guard 50 as a guide. New rivets 60 are then inserted from the outside surface 62 of the sidewall 14 of the trailer, through the new apertures of the sidewall 14 and the upper portion of the base rail, as well as through the pre-punched apertures 70 of the bumper guard 50, in order to couple the bumper guard 50 to the base rail 18. As noted above, the rivets 60 are bucked to fill the naturally tapered holes 70 of the bumper guard 50 and to create a generally smooth, snag-free outer surface 54 of the bumper guard 50. As an alternative to drilling new holes through the sidewall 14 and upper portion of the base rail 18, the pre-punched apertures 70 of the bumper guard 50 may be aligned with the pre-existing apertures of the sidewall 14 and upper portion of the base rail through which the now-removed rivets 24 were located. New rivets may 60 then be installed from outside the trailer.

The bumper guard 50 generally extends the length of the trailer and may include any number of base rail sections having any suitable length. Illustratively, the bumper guard 50 operates to resist the damage from the steel wheel of a truck lift, or other cargo or equipment within the storage container. Further, any section of the bumper guard 50 is able to be replaced after any amount of wear and tear to that section of the bumper guard 50 occurs. Thus, damage to the upper portion 20 of the base rail 18, which provides structural support to the trailer, is minimized if not prevented, and removal or replacement of the entire base rail 18 due to wear is generally eliminated. Further, the bumper guard 50 is a much less-costly and lighter option than base rail covers which function to cover the entire upper portion 20 of the base rail 18 while also effectively and efficiently operating the protect the most damage-prone portion of the base rail 18.

Looking now to FIG. 5, an alternative base rail 118 is provided. The alternative base rail 118 is similar to the base rail 18. Thus, like reference numerals are used to denote the same or similar components. For example, the alternative base rail 118 includes an alternative upper portion 120, the ledge 44, and the lower portion 22. The alternative upper portion 120 is coupled to the inner surface 23 of the sidewall 14 and the lower portion 22 is coupled to the end of the cross-members 40 of the floor assembly 16. The sidewall 14 rests upon the upper surface 46 of the ledge 44 of the alternative base rail 118. As with the base rail 18, the alternative base rail 118 provides structural support for the attachment of the sidewall 14 to the floor assembly 26 of the trailer.

The alternative base rail 118 includes three rivets 24 coupling the upper portion 120 of the base rail 118 to the inner surface 23 of the sidewall 14. As with the base rail 18, the rivets 24 are positioned so that the rivet heads 28 protrude inwardly from the inner surface 26 of the upper portion 120 of the base rail 118 into the interior of the storage container. The alternative base rail 118 also includes a plurality of raised ridges 30 extending along a length of the base rail 118 and protruding inwardly into the interior of the storage container. The alternative base rail 118, however, only includes three raised ridges 30, as shown in FIG. 5. Specifically, the base rail 118 is lacking the second-highest raised ridge 30 of the base rail 18. In other words, the base rail 118 extrusion has eliminated the second-highest raised ridge 30 provided on the base rail 18. The base rail 118 includes the lower-most planar surface 32 of the inner surface of the base rail 118 between the two lower-most raised ridges 30 and a larger planar surface 132 between the upper-most raised ridge 30 and the middle raised ridge 30.

The alternative base rail 118 also includes the bumper guard 50 of the present disclosure. The bumper guard 50 is positioned between the two top rivets 24 (i.e., between the upper-most rivet 24 and the middle rivet 24) such that the planar surface 52 of the bumper guard 50 is adjacent to and engaged with the large planar surface 132 of the base rail 118, and the curved inner surface 54 of the bumper guard 50 is curved inwardly to extend away from the inner surface 23 of the base rail 118 into the interior of the storage container. As with the base rail 18, the bumper guard 50 of the base rail 118 is configured to extend further inwardly into the interior of the storage container than the rivet heads 28 coupling the upper portion 120 of the base rail 118 to the sidewall 14.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A base rail configured to be coupled to a sidewall and floor assembly of the trailer, comprising:
   an upper portion configured to be coupled to the inner surface of a sidewall of a trailer, wherein the upper portion includes a plurality of spaced-apart ridges configured to extend inwardly away from an inner surface of the upper portion and into a storage area of the trailer;
   a lower portion configured to be coupled to the floor assembly of the trailer;
   a bumper guard coupled to the inner surface of the upper portion and positioned between spaced-apart ridges; and
   a plurality of rivets coupling the bumper guard to the base rail, wherein a head of each rivet is configured to be positioned adjacent an outside surface of the sidewall of the trailer and an end of each rivet is substantially flush with an inner surface of the bumper guard,
   wherein the bumper guard extends further inwardly into the storage area of the trailer than the spaced-apart ridges, and
   wherein the bumper guard is made from a material that is harder than the upper portion of the base rail.

2. The base rail of claim 1, wherein the bumper guard is approximately 1 inch tall and 5/16 inch wide.

3. The base rail of claim 1, wherein the bumper guard is made of steel and the upper portion of the base rail is made of aluminum.

4. The base rail of claim 1, wherein the bumper guard is generally half-oval in cross-sectional shape and includes a planar, outer surface adjacent the inner surface of the upper portion and wherein the inner surface of the bumper guard is curved and configured to extend inwardly into an interior of the storage area of the trailer.

5. The base rail of claim 1, wherein the bumper guard includes a plurality of apertures formed therethrough, and wherein each aperture is tapered from an inner surface of the bumper guard to an outer surface of the bumper guard.

6. The base rail of claim 1, wherein the bumper guard is positioned between the two upper-most raised ridges of the upper portion.

7. The base rail of claim 6, wherein a planar surface of the upper portion between the two upper-most raised ridges defines approximately the same height as the bumper guard.

8. The base rail of claim 6, wherein the bumper guard is positioned between the two upper-most rivets of the plurality of rivets.

9. The base rail of claim 1, wherein the bumper guard is spaced-apart from the floor assembly and is positioned within an upper half of the upper portion.

10. A base rail configured to be coupled to a sidewall and floor assembly of a trailer, comprising:
    an upper portion configured to be coupled to the inner surface of a sidewall of a trailer, wherein the upper portion includes a plurality of spaced-apart ridges configured to extend inwardly away from an inner surface of the upper portion and into a storage area of the trailer;
    a lower portion configured to be coupled to the floor assembly of the trailer; and
    a bumper guard coupled to the inner surface of the upper portion and positioned between spaced-apart ridges,
    wherein the bumper guard includes a plurality of pre-punched apertures formed therethrough, and wherein each pre-punched aperture is tapered from an inner surface of the bumper guard to an outer surface of the bumper guard.

11. The base rail of claim 10, wherein a width of the bumper guard is greater than a width of the raised ridges.

12. The base rail of claim 10, wherein the bumper guard is made of a different material than the upper portion of the base rail.

13. The base rail of claim 12, wherein the bumper guard is made of a harder material than the upper portion of the base rail.

14. The base rail of claim 10, further comprising a plurality of rivets coupling the bumper guard to the upper portion of the base rail, wherein each of the plurality of rivets includes a head configured to be positioned adjacent an outside surface of the sidewall of the trailer, and an end adjacent and flush with the inner surface of the bumper guard.

15. A method of coupling a base rail to a trailer, comprising:

coupling an upper portion of the base rail to an inner surface of the sidewall;

placing a bumper guard adjacent an inner surface of the upper portion between two raised ridges of the upper portion of the base rail, wherein the bumper guard includes pre-punched apertures;

drilling holes through the upper portion of the base rail and the sidewall using the pre-punched apertures of the bumper guard as a guide; and inserting rivets through the drilled holes and pre-punched apertures from outside the sidewall to position the head of the rivet adjacent an outside surface of the sidewall.

16. The method of claim 15, wherein inserting rivets includes bucking an end of the rivet to create a smooth, inner surface of the base rail.

17. The method of claim 15, wherein coupling an upper portion of the base rail includes inserting rivets through the base rail and the sidewall in order to position the head of the rivets adjacent an inside surface of the upper portion of the base rail.

18. The method of claim 15, further comprising removing the bumper guard from the upper portion of the base rail, and coupling a second bumper guard to the upper portion of the base rail.

* * * * *